Sept. 13, 1949.  H. WALL ET AL  2,481,960
HINGE FOR MOUNTING SUN SHIELDS ON CAP VISORS
Filed Sept. 5, 1947
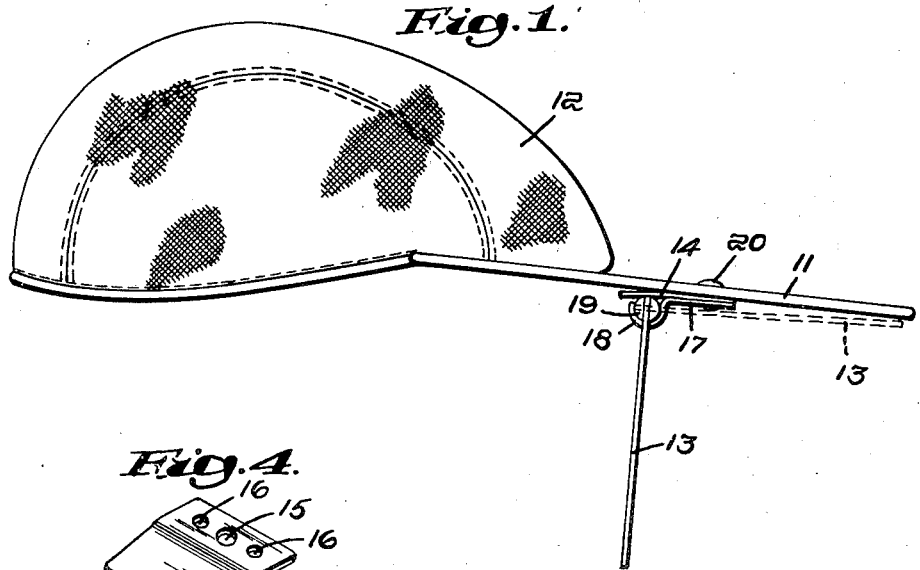
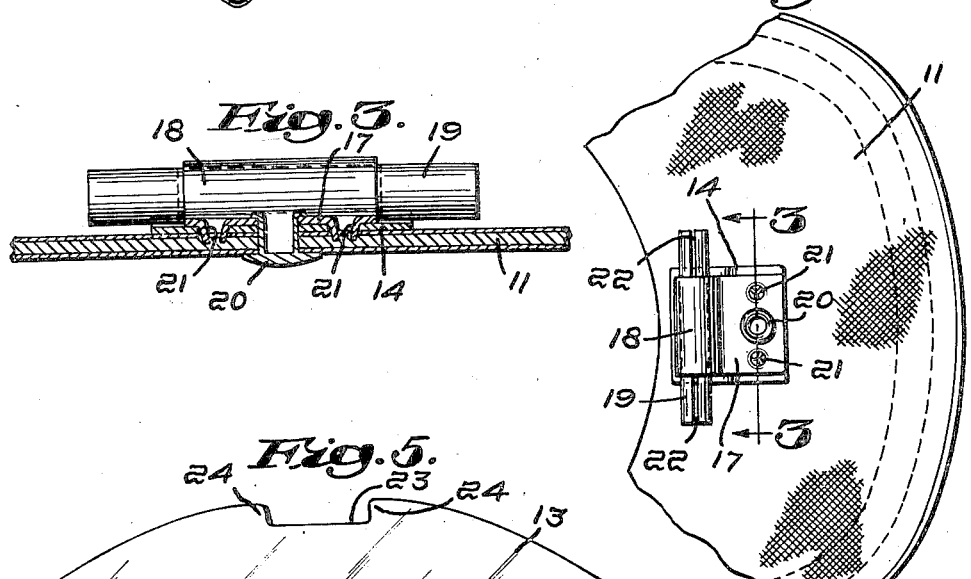
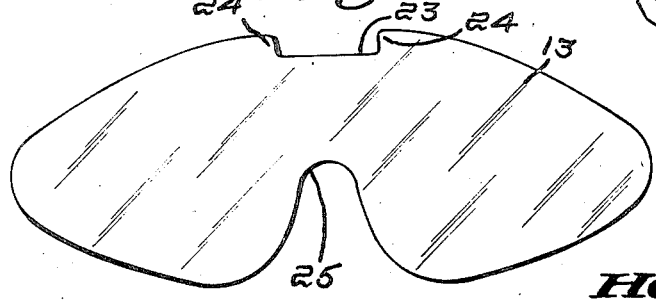
Inventors:
Howard Wall,
Leo Wall,
by Thomson & Thomson
Attorneys Patented Sept. 13, 1949

2,481,960

UNITED STATES PATENT OFFICE 2,481,960

HINGE FOR MOUNTING SUN SHIELDS ON CAP VISORS

Howard Wall and Leo Wall, Brookline, Mass.

Application September 5, 1947, Serial No. 772,448

3 Claims. (Cl. 2—10)

This invention relates to sun shields for cap visors or the like, and pertains more particularly to improvements in means for pivotally mounting a sun shield on the underside of a cap visor, so that it may be swung downwardly to shielding position before the eyes of the wearer, or upwardly against the visor when the shield is not required.

The principal purpose of the invention is to provide a simple, economical and efficient hinge connection between the sun shield and the cap visor, so that the hinge parts may be easily and securely attached to the visor without danger of accidental rotation, and so that a sun shield of plastic or other suitable material may be quickly connected to the hinge and be freely movable to the desired position of adjustment.

A recommended embodiment of the invention is illustrated in the accompanying drawings, in which:

Fig. 1 is a side view of a sports cap equipped with the improved shield and hinge;

Fig. 2 is a fragmentary bottom view of the cap visor, showing the hinge parts attached thereto, with the sun shield removed;

Fig. 3 is an enlarged section on line 3—3 of Fig. 2;

Fig. 4 is a detail perspective view of a spring plate forming part of the improved hinge; and Fig. 5 is a detail plan view of the sun shield.

The hinged shield is pivotally attached to the relatively stiff visor 11 of a cap 12, such as used by skiers, ball players or others, in such position that the plastic sun shield 13 may be swung downwardly to the full line position of Fig. 1, to absorb sun rays or reflected glare and protect the eyes of the wearer, or upwardly to the broken line position of Fig. 1, when its shielding effect is not desired. The shield is constructed or colored to reduce or eliminate direct sunlight or glare, in accordance with common practice.

The hinge parts connecting the shield to the visor comprise a base plate 14 of resilient metal having a central opening 15 and a pair of side openings 16; a co-operating clamp plate 17 also centrally apertured and formed with a semicircular clamp portion 18; and a pivot rod or barrel part 19 rotatively held between the clamp 18 and the spring plate 14 when the two plates are fastened to the visor by a rivet 20 passing through the central openings of the two plates and through the visor (Fig. 3).

The clamp plate 17 is provided with indented prongs 21, passing through the openings 16 of the spring plate and into the visor material, to prevent rotation of the plates on the rivet 20.

The ends of the rod 19 extend beyond the clamp part 18 and are provided with diametrical slits 22, and one edge of the glare shield 13 is formed with a recess 23 in which the hinge is received when the corner parts 24, defined by said recess, are fitted into said slits 22, as indicated in Fig. 1. The pivot rod may be made of plastic or other suitable material, and the interfitted corners of the plastic shield may be secured in the slits by cement or by the application of a suitable solvent, if desired. The interfitting relation of the parts is preferably such, however, that the shield will have adequate frictional engagement in the retaining slits of the pivot 19, without the necessity of using cement; and in such case, the shield is readily removable when desired.

The curved portion of the clamp plate is sufficiently close to the underlying resilient end of the spring plate 14 so that the rod 19 is tightly held in the curved clamp by the spring plate, yet may be rotated therein by swinging the attached sun shield under constant tension regardless of wear on the pivot. The edge of the curved portion is spaced from the spring plate to permit contraction under normal wear of the pivotally connected parts.

The shield has the usual bottom cut-out 25 to accommodate the wearer's nose, and may otherwise be of such size and shape as desired, according to the size of the cap visor to which it is pivotally connected as aforesaid.

We claim:

1. Devices for pivotally connecting a sun shield to a cap visor, comprising a spring plate disposed against the underside of the visor, a clamp plate having a flat portion juxtaposed to the spring plate and a curved portion spaced from the spring plate, a pivot rod rotatably mounted between said curved portion of the clamp plate and said spring plate, the ends of the rod projecting beyond the sides of the clamp plate, said projecting ends having slits, a sun shield having corner portions received and retained in said slits, and fastening means passing through both clamp plates and the visor for securing the plates to each other and to the visor.

2. Devices for pivotally connecting a sun shield to a cap visor, comprising a spring plate disposed against the underside of the visor, a clamp plate having a flat portion juxtaposed to the base plate and a curved portion spaced from the base plate, a rod rotatably mounted between said curved portion of the clamp plate and said spring plate, the ends of the rod projecting beyond the sides of the clamp plate, said projecting ends having diametrical slits therein, a sun shield having corner portions received and retained in the respective slits, and a rivet passing through the juxtaposed portions of said plates and through said visor for securing the plates to each other and to the visor, the flat portion of the clamp plate having prongs extending through the spring plate and into the visor to prevent rotation of the plates on said rivet.

3. Devices for pivotally connecting a sun shield to a cap visor, comprising a spring plate disposed against the underside of the visor, a clamp plate having a flat portion juxtaposed to the base plate and a curved portion spaced from the base plate, a rod rotatably mounted between said curved portion of the clamp plate and said spring plate, the ends of the rod projecting beyond the sides of the clamp plate, said projecting ends having diametrical slits therein, a sun shield having corner portions frictionally and removably received and retained in the respective slits, and a rivet passing through the juxtaposed portions of said plates and through said visor for securing the plates to each other and to the visor, the flat portion of the clamp plate having prongs extending through the spring plate and into the visor to prevent rotation of the plates on said rivet.

HOWARD WALL.
LEO WALL.

REFERENCES CITED

The following references are of record in the file of this patent:

UNITED STATES PATENTS

| Number | Name | Date |
|---|---|---|
| 1,833,741 | Diehl | Nov. 24, 1931 |
| 1,942,663 | Saunders | Jan. 9, 1934 |